US009039489B2

(12) United States Patent
Cooper et al.

(10) Patent No.: US 9,039,489 B2
(45) Date of Patent: *May 26, 2015

(54) METHOD AND APPARATUS FOR RECONDITIONING DIGITAL DISCS

(75) Inventors: Ivan George Cooper, Chilliwack (CA); Mark Charles Chaplin, Langley (CA)

(73) Assignee: DISC GO TECHNOLOGIES, INC., LANGLEY, BRITISH COLUMBIA (CA)

( * ) Notice: Subject to any disclaimer, the term of this patent is extended or adjusted under 35 U.S.C. 154(b) by 54 days.

This patent is subject to a terminal disclaimer.

(21) Appl. No.: 11/980,943

(22) Filed: Oct. 31, 2007
(Under 37 CFR 1.47)

(65) Prior Publication Data

US 2008/0064305 A1 Mar. 13, 2008

Related U.S. Application Data

(63) Continuation of application No. 11/312,894, filed on Dec. 19, 2005, now Pat. No. 7,357,696, which is a continuation-in-part of application No. 09/611,625, filed on Jul. 7, 2000, now Pat. No. 6,991,524.

(51) Int. Cl.
| | |
|---|---|
| B24B 1/00 | (2006.01) |
| B29B 17/02 | (2006.01) |
| G11B 23/00 | (2006.01) |
| G11B 23/50 | (2006.01) |
| B29L 17/00 | (2006.01) |

(52) U.S. Cl.
CPC .......... *B29B 17/02* (2013.01); *B29L 2017/005* (2013.01); *G11B 23/00* (2013.01); *G11B 23/505* (2013.01)

(58) Field of Classification Search
USPC .......... 451/5, 9–11, 56, 57, 65–68, 443, 444; 15/77, 102; 901/40; 414/627
See application file for complete search history.

(56) References Cited

U.S. PATENT DOCUMENTS

| | | | | |
|---|---|---|---|---|
| 5,099,618 | A | * | 3/1992 | Schmid ........................... 451/57 |
| 5,333,413 | A | * | 8/1994 | Hashimoto ....................... 451/9 |
| 5,826,292 | A | * | 10/1998 | Ikemoto ........................ 15/102 |
| 6,013,894 | A | * | 1/2000 | Cheng et al. ............. 219/121.69 |
| 6,062,954 | A | * | 5/2000 | Izumi ............................. 451/72 |
| 6,071,344 | A | * | 6/2000 | Perego ......................... 118/500 |
| 6,095,908 | A | * | 8/2000 | Torii ............................ 451/285 |
| 6,227,950 | B1 | * | 5/2001 | Hempel et al. ................. 451/66 |

(Continued)

*Primary Examiner* — Dung Van Nguyen
(74) *Attorney, Agent, or Firm* — Stinson Leonard Street LLP

(57) ABSTRACT

An automated method for reconditioning a plurality of digital discs within a reconditioning apparatus is disclosed. The method comprises holding the digital discs in a load area, and then transferring each of the digital discs from the load area to at least one workstation with a disc transfer mechanism. The method also comprises reconditioning each of the digital discs transferred to the workstation with at least one worktool operable to remove a portion of the protective coating of each of the digital discs without removal of the data underlying the protective coating. The method further comprises transferring each of the digital discs from the workstation to an unload area with the disc transfer mechanism, and then holding the digital discs in the unload area for manual retrieval. Advantageously, the digital discs may be automatically reconditioned within the reconditioning apparatus without manual manipulation of the digital discs during the reconditioning process. Various exemplary embodiments of the reconditioning apparatus and associated method are provided.

30 Claims, 10 Drawing Sheets

(56) References Cited

U.S. PATENT DOCUMENTS

| | | | |
|---|---|---|---|
| 6,368,183 B1 * | 4/2002 | Trojan et al. | 451/8 |
| 6,379,230 B1 * | 4/2002 | Hayashi et al. | 451/292 |
| 7,092,337 B2 | 8/2006 | Butler et al. | |
| 7,357,696 B2 * | 4/2008 | Cooper et al. | 451/57 |

* cited by examiner

METHOD AND APPARATUS FOR RECONDITIONING DIGITAL DISCS

CROSS-REFERENCE TO RELATED APPLICATIONS

This application is a continuation of U.S. patent application Ser. No. 11/312,894, filed on Dec. 19, 2005, now U.S. Pat. No. 7,357,696 which is a continuation-in-part of U.S. patent application Ser. No. 09/611,625, filed on Jul. 7, 2000, now U.S. Pat. No. 6,991,524 entitled "Method and Apparatus for Reconditioning Digital Discs," both of which are incorporated herein, in their entireties, by reference.

STATEMENT REGARDING FEDERALLY SPONSORED RESEARCH OR DEVELOPMENT

Not applicable.

BACKGROUND OF THE INVENTION

1. Field of the Invention

The present invention relates to a method and apparatus for reconditioning digital discs and, more particularly, to an automated method and apparatus that allows digital discs to be reconditioned without manual manipulation of the digital discs during the reconditioning process.

2. Description of Related Art

Digital discs are used to store many different types of information, such as computer data, video games, music, movies and the like. Two of the more common types of digital discs are compact discs (CDs) and digital video discs (DVDs). Typically, a digital disc comprises a layer of aluminum on which is deposited digital data to be read by a computer, video game system, CD player, DVD player and the like. A plastic protective coating overlays the digital data so as to provide protection for the data on the digital disc.

The protective coating of a digital disc may become scratched or otherwise damaged during use of the disc. This occurs more frequently in situations where the digital disc is not owned by the user, such as in rental operations where a customer has no particular reason to take care of the digital disc during rental. As a result, the digital disc may be returned to the rental establishment in a damaged condition. Because the digital data underlying the protective coating typically retains its integrity, it is possible to restore the protective coating to its original condition or, at least, to a condition where the digital data can be properly read through the protective coating. By so doing, the need for discarding the damaged digital disc is obviated and, thus, it is not necessary to incur the expense of purchasing an additional copy of the digital disc.

Various apparatuses for reconditioning the protective coating of a digital disc are known in the art (see, for example, U.S. Pat. No. 5,954,566 to Bauer, U.S. Pat. No. 5,733,179 to Bauer, and U.S. Pat. No. 6,322,430 to Kennedy). However, in each of these apparatuses, the digital disc must be manually manipulated during the reconditioning process. Thus, in order to recondition a large number of digital discs, the operator must manually place each of the digital discs into the apparatus, wait for the reconditioning process to be completed, and then manually remove each of the digital discs from the apparatus. In some of these apparatuses, the operator must also manipulate each of the digital discs during the reconditioning process itself. It can be appreciated that the time and manpower needed to recondition a large number of digital discs in these apparatuses can be prohibitive. As such, these apparatuses are best-suited for reconditioning a single digital disc or a small number of digital discs.

SUMMARY OF THE INVENTION

The present invention is directed to an automated method for reconditioning a plurality of digital discs within a reconditioning apparatus. In accordance with the invention, a plurality of digital discs are placed in a load area, whereby a disc transfer mechanism successively transfers each of the digital discs from the load area to one or more workstations. Each workstation includes a turntable for supporting a digital disc, and at least one worktool operable to remove a portion of the protective coating of the digital disc without removal of the digital data underlying the protective coating. The disc transfer mechanism then successively transfers each of the digital discs from the one or more workstations to an unload area for manual retrieval.

In a first exemplary embodiment, the reconditioning apparatus comprises a load area that includes a load cartridge configured to hold a plurality of digital discs to be reconditioned. The load area also includes a turntable that is rotatable between a load position (wherein each of the digital discs is successively deposited from the load cartridge onto the turntable) and an unload position (wherein each of the digital discs is successively removed from the turntable for transfer to the workstations).

In this embodiment, four workstations are used for reconditioning each of the digital discs. The first and second workstations each include a rotatable turntable for supporting a digital disc, and rotatable worktools operable to sand the protective coating of the digital disc. The third workstation includes a rotatable turntable for supporting a digital disc, and worktools operable to rinse and wax the protective coating of the digital disc. The fourth workstation includes a rotatable turntable for supporting a digital disc, and rotatable worktools operable to polish the protective coating of the digital disc.

The disc transfer mechanism of this embodiment comprises multiple suction tools operable to transfer each of the digital discs from the turntable of the load area (in its unload position) to the turntables of each of the four workstations and to an unload area. The unload area includes an unload cartridge configured to hold all of the digital discs after reconditioning for manual retrieval by the operator. A controller is used to properly sequence the various events occurring during the reconditioning process.

In a second exemplary embodiment, the reconditioning apparatus comprises a load area that includes a load stack configured to hold a plurality of digital discs to be reconditioned. In this embodiment, a single workstation is used for reconditioning each of the digital discs. The workstation includes a disc tray with a rotatable turntable for supporting a digital disc. The disc tray is moveable between an extended position (wherein a digital disc may be deposited onto the turntable) and a retracted position (wherein a digital disc may be reconditioned within the apparatus). The workstation also includes worktools operable to remove a portion of the protective coating of a digital disc without removal of the data underlying the protective coating.

The disc transfer mechanism of this embodiment comprises a rotatable pick-up mechanism having a first arm positioned substantially perpendicular to a second arm. The first arm is operable to grasp a digital disc from the load stack and deposit the digital disc on the turntable of the workstation (when in its extended position). The second arm is operable to grasp a digital disc from the turntable of the workstation (when in its extended position) and deposit the digital disc at an unload area. The unload area includes an unload stack configured to hold all of the digital discs after reconditioning for manual retrieval by the operator. A controller is used to properly sequence the various events occurring during the reconditioning process.

The reconditioning apparatus of the present invention has several advantages over the prior art. For example, a large number of digital discs may be automatically reconditioned within the reconditioning apparatus without manual manipulation of the digital discs during the reconditioning process. As a result, the time and manpower needed to recondition a large number of digital discs is greatly reduced. Of course, other advantages of the present invention will be apparent to one skilled in the art.

BRIEF DESCRIPTION OF THE DRAWINGS

The present invention will be described in greater detail in the following detailed description of the invention with reference to the accompanying drawings that form a part hereof, in which.

DETAILED DESCRIPTION OF THE INVENTION

The present invention is directed to an automated method for reconditioning a plurality of digital discs within a reconditioning apparatus. A first exemplary embodiment of a reconditioning apparatus constructed in accordance with the present invention is shown in FIGS. 1-4, and a second exemplary embodiment of a reconditioning apparatus constructed in accordance with the present invention is shown in FIGS. 5-14. While the present invention will be described in detail hereinbelow with reference to these exemplary embodiments, it should be understood that the invention is not limited to the specific constructions of the reconditioning apparatuses shown in these embodiments. Rather, one skilled in the art will appreciate that a wide variety of reconditioning apparatuses may be constructed in accordance with the present invention.

First Exemplary Embodiment

Figure 1:
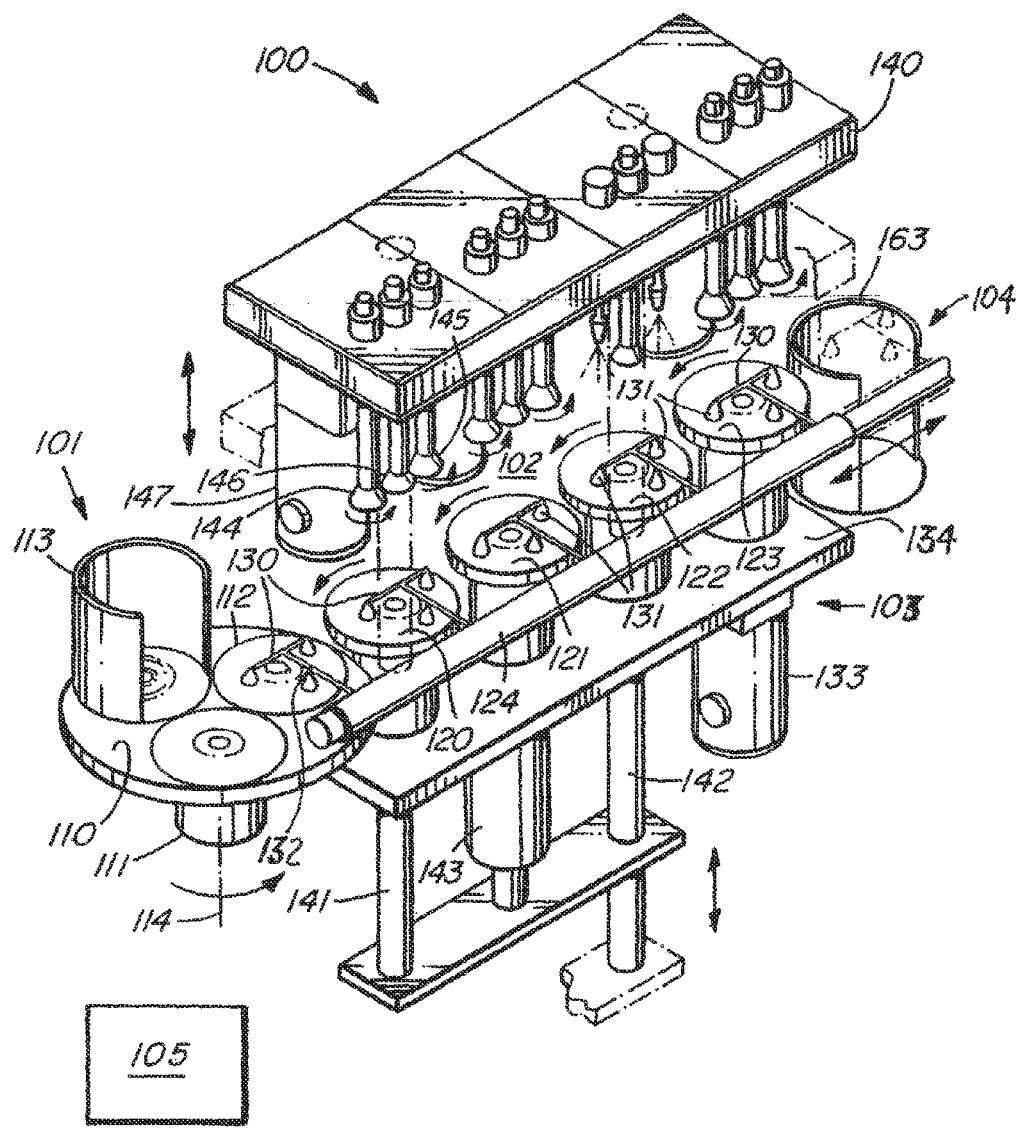
FIG. 1 is a perspective view of a reconditioning apparatus in accordance with a first exemplary embodiment of the present invention.

Referring to FIG. 1, a reconditioning apparatus constructed in accordance with a first exemplary embodiment of the present invention is illustrated generally at 100. Apparatus 100 comprises four principal operating areas, namely, a load area generally illustrated at 101, a disc reconditioning area generally illustrated at 102, a motive area generally illustrated at 103, and an unload area generally illustrated at 104. As will be described in detail hereinbelow, a controller 105 is used to properly sequence the various events occurring during the reconditioning process.

Load Area

Figure 3:
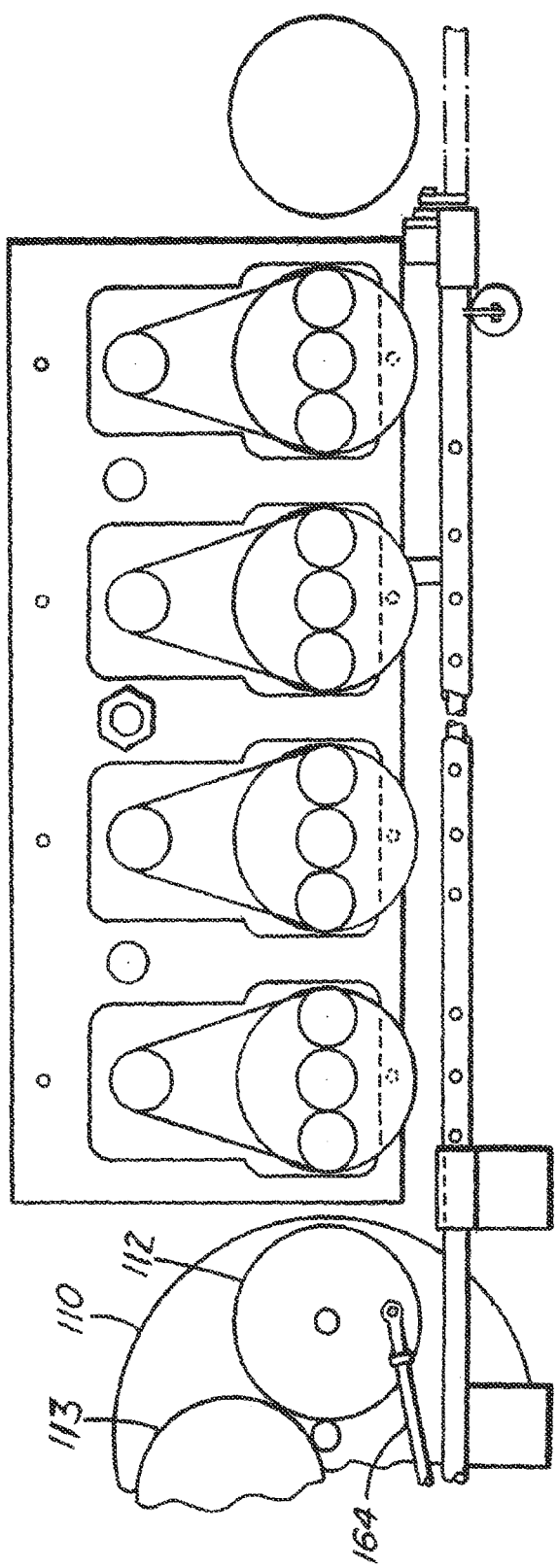
FIG. 3 is a top view of the reconditioning apparatus of FIG. 1, showing the rotatable turntable of the load area, the worktools and drive belts of each of the workstations, and the rotatable shaft of the disc transfer mechanism.

Referring to FIGS. 1 and 3, load area 101 comprises a turntable 110 that is rotatable by an electric motor 111, such as a DC type motor. Motor 111 is adjustable to provide various revolution speeds as the operator may desire for a particular operation. Turntable 110 is a plastic composite type turntable with a circular recess 112 (or multiple circular recesses) formed therein. Recess 112 is approximately 3/16 inch deep and has the approximate diameter of a digital disc to be reconditioned. Load area 101 further includes a load cartridge 113 that is configured to hold a plurality of digital discs. In this embodiment, load cartridge 113 is configured to hold 60 to 100 digital discs. Each of these digital discs enters recess 112, one by one, during the load operation.

Turntable 110 is rotatable about an axis of rotation 114 by use of an arm or bell crank 164 (shown in FIG. 3). Bell crank 164 is operated by motor 111 and functions to rotate turntable 110 between a load position and an unload position. In the load position, recess 112 is positioned directly beneath load cartridge 113, whereby a single digital disc is deposited from load cartridge 113 into recess 112. In the unload position, the digital disc held by recess 112 is brought into position for removal by suction tools (described hereinbelow), whereby the digital disc is advanced to various workstations for reconditioning. Of course, the speed of motor 111 can be increased or decreased in order to change the speed with which the digital discs enter disc reconditioning area 102 (described hereinbelow).

Disc Reconditioning Area

Figure 2:
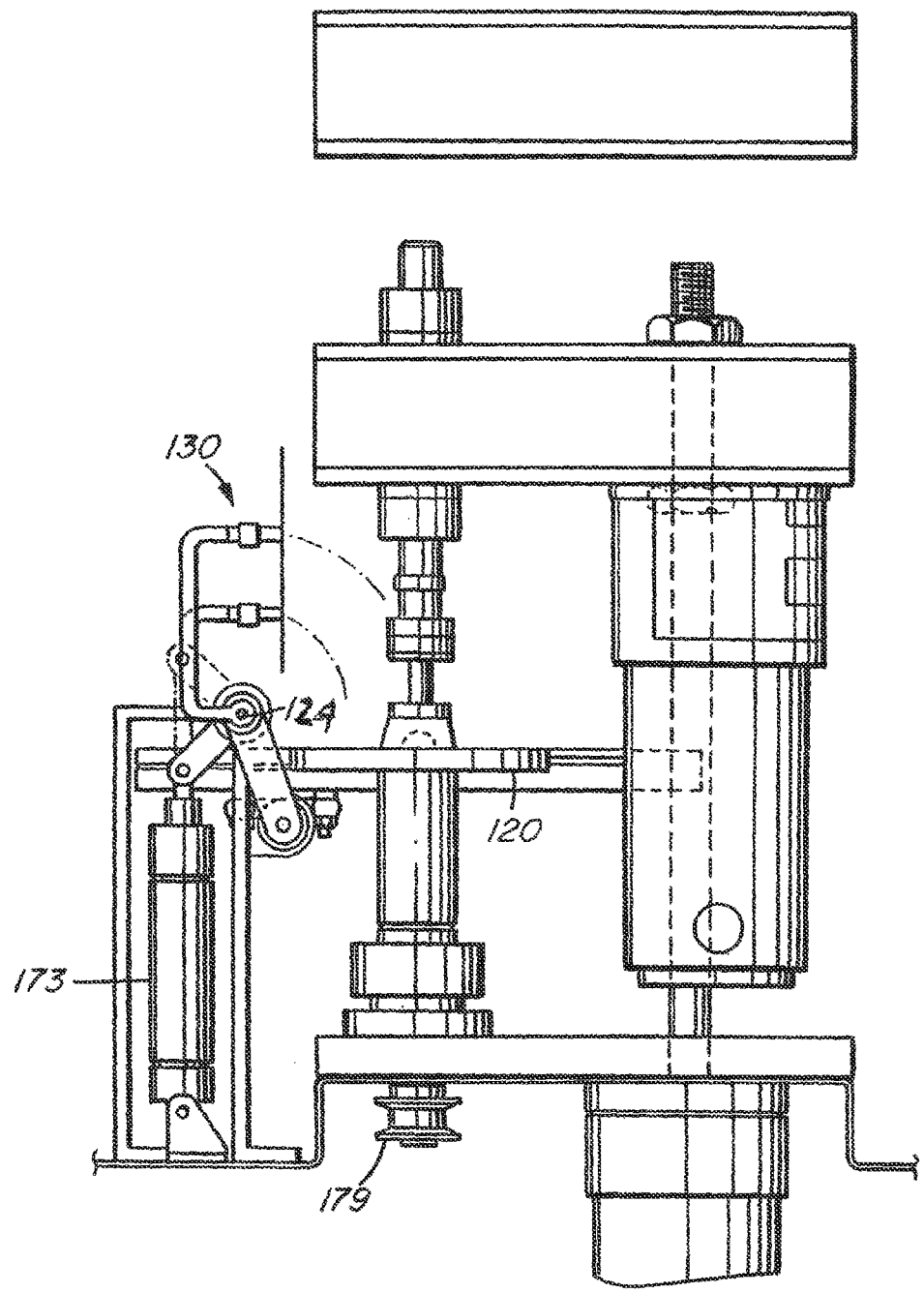
FIG. 2 is a side view of the reconditioning apparatus of FIG. 1, showing the rotatable shaft and suction tools of the disc transfer mechanism used to advance a digital disc through the reconditioning apparatus.
Figure 4:
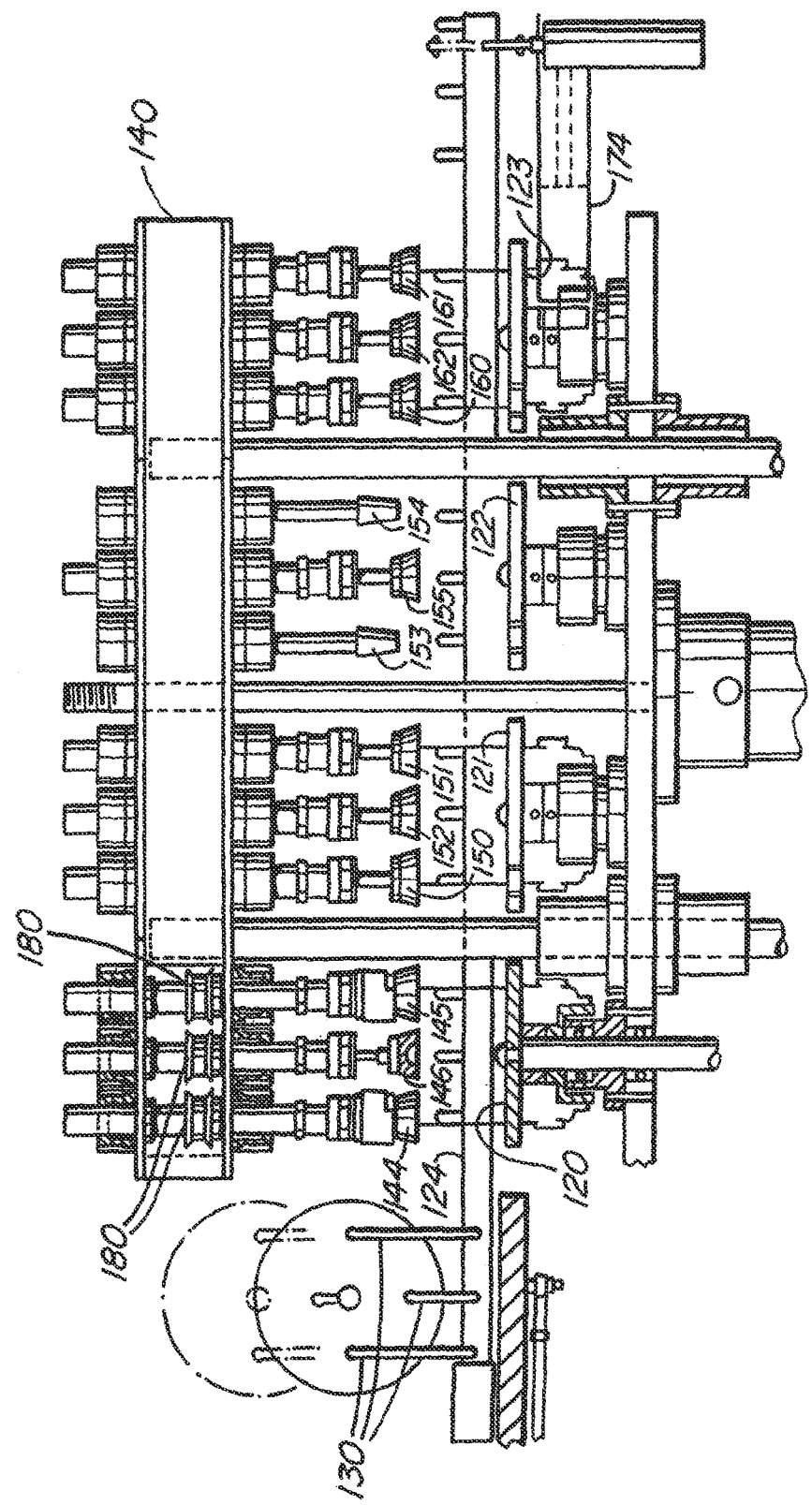
FIG. 4 is a front view of the reconditioning apparatus of FIG. 1, showing the rotatable turntable and worktools of each of the workstations.

Referring to FIGS. 1 and 4, disc reconditioning area 102 comprises a series of four workstations each of which includes a rotatable turntable 120, 121, 122, 123. An electric motor 133, such as a DC type motor, is mounted on a lower frame 134 and drives turntables 120, 121, 122, 123 at rotational speeds as desired by the operator for a particular operation. As best seen in FIG. 2, motor 133 drives turntables 120, 121, 122, 123 by rotation of pulleys 179 (only one of which is shown) connected via belts (not shown) to turntables 120, 121, 122, 123.

The first workstation defined by turntable 120 is a sanding workstation. This workstation includes three worktools 144, 145, 146. Worktools 144, 145 are sanding tools that utilize an aluminum oxide or carbide material for contacting and sanding the protective coating of the digital disc on turntable 120. Worktools 144, 145 remove a small amount of material from the protective coating of the digital disc on turntable 120 to thereby perform the initial reconditioning operation. Worktool 146 is a holding member that exerts a downwardly directed force on the digital disc on turntable 120. Worktool 146 has a head that rotates with turntable 120. The function of worktool 146 is to exert sufficient force on the digital disc on turntable 120 so as to avoid any skipping or other dislocated movement of the digital disc during contact with worktools 144, 145.

The second workstation defined by turntable 121 is another sanding workstation. This workstation includes three worktools 150, 151, 152. Worktools 150, 151 are sanding tools that utilize a borax powdered material for contacting and sanding the protective coating of the digital disc on turntable 121. Worktools 150, 151 finely remove an additional amount of material from the protective coating of the digital disc on turntable 121 (which may be present following the material removal at the first workstation). Worktool 152 is identical to worktool 146 described hereinabove and functions to maintain the digital disc on turntable 121.

The third workstation defined by turntable 122 is a rinse and wax workstation. This workstation includes three worktools 153, 154, 155. Worktool 153 emits a rinsing solution to rinse off any material that has been removed from the digital disc at the first and second workstations. Worktool 154 emits a waxing material to coat the upper surface of the digital disc on turntable 122 and thereby provide a new protective coating. It should be understood that worktools 153, 154 are positioned in close proximity to, but do not contact, the digital disc on turntable 122. Worktool 155 is identical to worktools 146, 152 described hereinabove and functions to maintain the digital disc on turntable 122.

The fourth workstation defined by turntable 123 is a polishing workstation. This workstation includes three worktools 160, 161, 162. Worktools 160, 161 are polishing tools that utilize a buffing material mounted on their heads for contacting and polishing the protective coating of the digital disc on turntable 121. Worktool 162 is identical to worktools 146, 152, 155 described hereinabove and functions to maintain the digital disc on turntable 123.

In this embodiment, there are three independently operated motors used to rotate worktools 144, 145 of the first workstation, worktools 150, 151 of the second workstation, and worktools 160, 161 of the fourth workstation. For example, worktools 144, 145 of the first workstation are rotated with the use of pulleys 180 (shown in FIG. 4) driven via belts (not shown) by a DC motor 147. Worktools 150, 151 of the second workstation and worktools 160, 161 of the fourth workstation are rotated in the same manner. The rotational speed of the worktools at each workstation may be adjusted relative to the rotational speed of the worktools at other workstations due to the different operations taking place at each of the workstations. It should be noted that no rotational movement of worktools 153, 154 of the third workstation is necessary because these worktools are used to emit a rinse solution and a wax solution, respectively.

Motive Area

Referring to FIG. 1, motive area 103 comprises a disc transfer mechanism that includes a rotatable and reciprocal shaft 124 connected to a plurality of suction tools 130. Shaft 124 is hollow so that it may carry a vacuum or negative pressure that is transferred to suction tools 130. The suction within shaft 124 is generated by passing pressurized air through a nozzle and over a port (not illustrated) attached to shaft 124. As best shown in FIG. 2, shaft 124 may be rotated about its axis by pneumatic cylinder 173, and, as shown in FIG. 4, may be reciprocated along its axis by pneumatic cylinder 174. Of course, hydraulic cylinders could alternatively be used instead of pneumatic cylinders 173 and 174.

In this embodiment, five sets of suction tools 130 are connected to shaft 124. Each set of suction tools 130 is comprised of three rubber suction heads 131 connected to a mounting frame 132. Mounting frame 132 is made from tubing that allows the suction within shaft 124 to be transferred to suction heads 131. Each set of suction tools 130 is used to simultaneously lift and move each of the digital discs from the load area to the first workstation, from the first workstation to the second workstation, from the second workstation to the third workstation, from the third workstation to the fourth workstation, and from the fourth workstation to unload area 104 (described hereinbelow).

Unload Area

Referring again to FIG. 1, unload area 104 comprises a receiving cartridge 163 positioned after the fourth workstation at the end of apparatus 100. Receiving cartridge 163 is configured to receive and hold each of the digital discs after the reconditioning process has been completed. It should be understood that the digital discs may then be manually retrieved from receiving cartridge 163 by the operator.

Operation

With reference to FIGS. 1-4, the operation of reconditioning apparatus 100 will now be described. In basic operation, a plurality of damaged digital discs to be reconditioned are received from one or more rental establishments or other sources. An operator stacks the digital discs, with their protective coating side facing upward, and places the stack of discs into load cartridge 113. The operator then starts the reconditioning apparatus 100, which begins the reconditioning process as described hereinbelow as sequenced and controlled by controller 105.

With the digital discs to be reconditioned stacked in load cartridge 113, controller 105 activates motor 111 and, in response, bell crank 164 rotates turntable 110 to the load position so that recess 112 of turntable 110 is positioned directly beneath load cartridge 113. The bottom digital disc drops from load cartridge 113 and is deposited into recess 112 of turntable 110. It should be understood that only a single digital disc is deposited into recess 112 of turntable 110, with the other digital discs remaining in load cartridge 113. Motor 111 then causes bell crank 164 to rotate turntable 110 clockwise to the unload position so that the damaged digital disc in recess 112 of turntable 110 is positioned beneath the first set of suction tools 130.

Controller 105 next actuates pneumatic cylinder 173 and, in response, shaft 124 is rotated so that the first set of suction tools 130 move downwardly into contact with the protective coating of the digital disc in recess 112 of turntable 110. Suction tools 130 then grasp the digital disc from recess 112 of turntable 110 using the suction therein. Next, pneumatic cylinder 173 causes reciprocal shaft 124 to rotate so that suction tools 130 move upwardly away from recess 112 of turntable 112 until the digital disc is held in a generally vertical orientation.

With the digital disc held in a generally vertical orientation, controller 105 actuates pneumatic cylinder 174 and, in response, shaft 124 is retracted horizontally until the digital disc is positioned adjacent turntable 120 of the first workstation. Next, controller 105 actuates pneumatic cylinder 173 and, in response, shaft 124 is rotated so that the first set of suction tools 130 move downwardly towards turntable 120 so that the digital disc is held in a generally horizontal orientation above turntable 120. Controller 105 then terminates the suction to suction tools 130 so that the digital disc is released and deposited onto turntable 120.

Next, controller 105 again actuates pneumatic cylinder 173 and, in response, shaft 124 is rotated so that the first set of suction tools 130 move upwardly away from turntable 120. Controller 104 then actuates pneumatic cylinder 174 and, in response, shaft 124 is retracted back horizontally until the first set of suction tools 130 are returned to their starting position above turntable 110. As such, the first set of suction tools 130 are in place to retrieve another digital disc from recess 112 of turntable 110.

With the digital disc deposited onto turntable 120 of the first workstation, controller 105 activates motor 133 so as to rotate turntable 120. Controller 105 also actuates pneumatic cylinder 143 and, in response, upper head 140 is lowered on guide rails 141, 142 until worktools 144, 145, 146 contact the digital disc on turntable 120. Controller 105 then activates motor 147 so as to rotate worktools 144, 145. The contact between worktools 144, 145 and the digital disc on turntable 120 operates to coarsely sand the protective coating of the digital disc. The head of worktool 146 exerts sufficient force on the digital disc so as to maintain the digital disc on turntable 120 during the course sanding operation.

Following the completion of the coarse sanding operation, controller 105 actuates pneumatic cylinder 143 and, in response, upper head 140 is raised on guide rails 141, 142 so as to disengage worktools 144, 145, 146 from contact with the sanded digital disc on turntable 120. Controller 105 also deactivates motor 147 so as to cease rotation of worktools 144, 145, and deactivates motor 133 so as to cease rotation of turntables 120.

In another iteration of the sequence described hereinabove, the digital disc is transferred from the first workstation to the second workstation and, simultaneously, another digital disc is transferred from load area 101 to the first workstation. It should be understood that each subsequent iteration adds an additional digital disc such that, after four iterations, apparatus 100 will be simultaneously course sanding a digital disc at the first workstation, fine sanding a digital disc at the second workstation, rinsing and waxing a digital disc at the third workstation, and polishing a digital disc at the fourth workstation. Of course, after a digital disc is polished at the fourth workstation, it is transferred to receiving cartridge 163 of unload area 104. This process continues until all of the digital discs in load cartridge 113 of load area 101 have been reconditioned and transferred to receiving cartridge 163 of unload area 104 for manual retrieval by the operator.

Second Exemplary Embodiment

Figure 5:
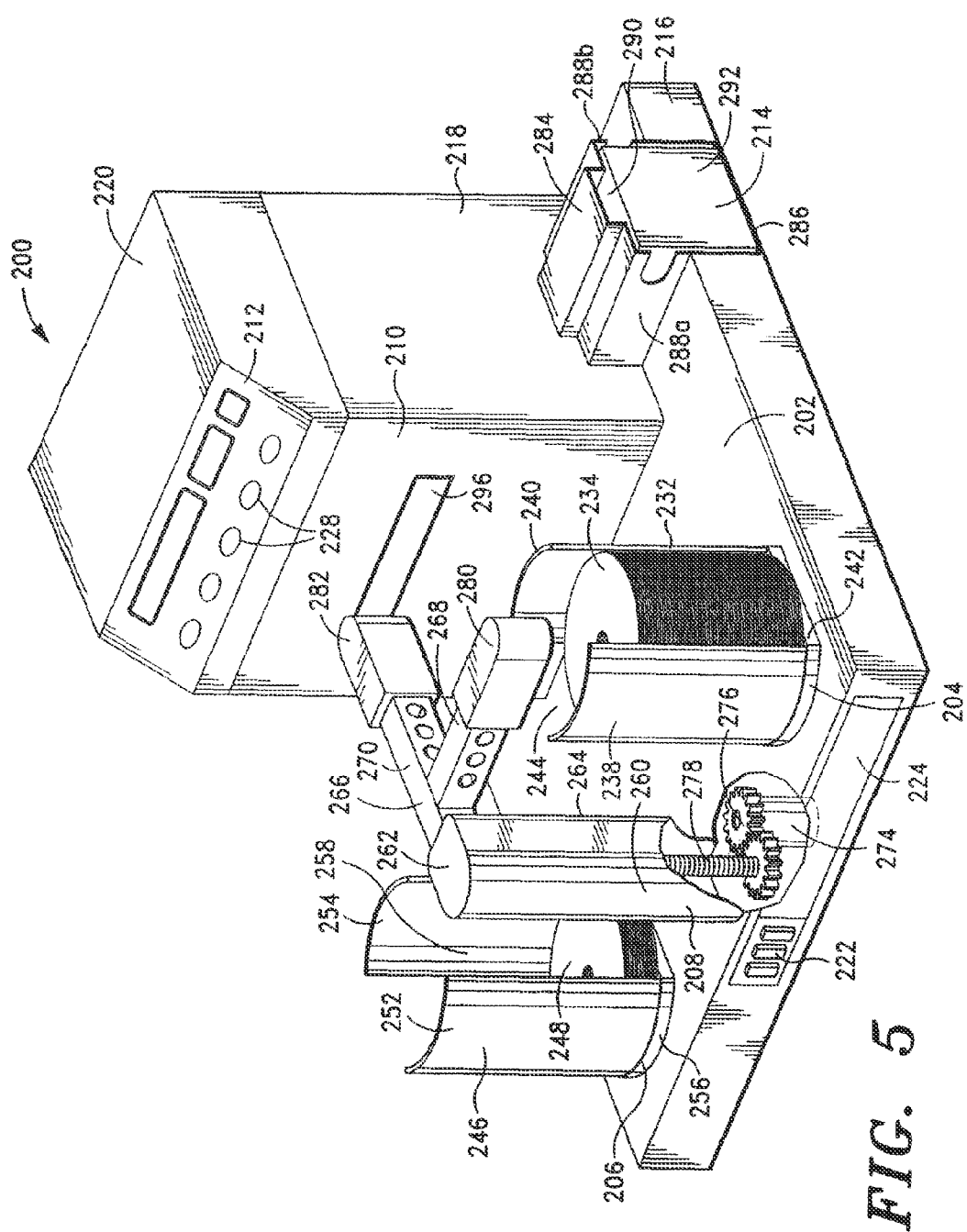
FIG. 5 is a perspective view of a reconditioning apparatus in accordance with a second exemplary embodiment of the present invention.

Referring to FIG. 5, a reconditioning apparatus constructed in accordance with a second exemplary embodiment of the present invention is illustrated generally at 200. Apparatus 200 comprises a housing 202 with six principal operating areas, namely, a load area generally illustrated at 204, an unload area generally illustrated at 206, a transfer mechanism area generally illustrated at 208, a workstation area generally illustrated at 210, a controller area generally illustrated at 212, and a cartridge area generally illustrated at 214. Each of these operating areas will be described in detail hereinbelow.

As can be seen in FIG. 5, housing 202 comprises a generally rectangular base 216 and a tower 218 extending upwardly from the rear center portion of base 216. Base 216 and tower 218 each comprise exterior walls joined to define a generally hollow interior portion. Electrical and fluid connections between components of the various operating areas are routed through the hollow interior portion of base 216 and tower 218 (as described in greater detail hereinbelow). The upper portion of tower 218 includes a lid 220 that is hingedly attached along its lower rear edge to tower 218. Thus, lid 220 may be lifted upwardly along its lower rear edge to allow access to the interior portion of tower 218 (i.e., where workstation area 210 is generally located).

Switches 222 located on the front wall 224 of base 216 allow an operator to manually operate and reset the apparatus. A power switch (not shown) located on the rear of base 216 allows an operator to apply or remove electrical power to apparatus 200. A controller (not shown) located within tower 218 is operable to properly sequence the various events occurring during the reconditioning process. In particular, the controller provides electrical output signals to, and receives electrical input or feedback signals from, the various components of transfer mechanism area 208, workstation area 210, controller area 212 and cartridge area 214. The controller may be any type of programmable control computer, single-board computer, programmable logic controller (PLC), or other type of device known in the art for performing a programmed sequence of events. A controller suitable for purposes of this embodiment is a single-board computer using two Atmel T89C51AC2 microprocessors, with one microprocessor dedicated to controlling the cleaning cartridge of the apparatus. Of course, other off-the-shelf or custom controllers may be used to implement the control function of this embodiment of the present invention, as will be apparent to those skilled in the art.

Load Area

Referring still to FIG. 5, load area 204 is located adjacent the front right edge of base 216 of housing 202. Load area 204 includes a load stack 232 configured to hold a plurality of digital discs 234 for reconditioning. In the illustrated embodiment, load stack 232 comprises a curved front wall 238 and a curved rear wall 240 attached to and extending upwardly from a bottom wall 242. Bottom wall 242 is affixed to base 216 so as to secure load stack 232 in place on housing 202. Bottom wall 242 is shaped as a truncated disc with two opposed flat edges and two opposed arced edges. Front wall 238 and rear wall 240 extend upwardly from the opposed arced edges of bottom wall 242 and are spaced such that the distance therebetween is slightly greater than the circumference of a digital disc. As such, digital discs 234 may be easily stacked in load stack 232 with the protective coating facing upward. As will be described in greater detail hereinbelow, a gap 244 defined between front wall 238 and rear wall 240 allows a load arm 268 of a disc transfer mechanism 260 to access digital discs 234 unimpeded.

Unload Area

Referring still to FIG. 5, unload area 206 is located adjacent the front left edge of base 216 of housing 202. Unload area 206 includes an unload stack 246 configured to hold a plurality of digital discs 248 that have been reconditioned within apparatus 200. As can be seen, the configuration of unload stack 246 is similar to that of load stack 232. Specifically, unload stack 246 comprises a curved front wall 252 and a curved rear wall 254 attached to and extending upwardly from a bottom wall 256. Bottom wall 256 is affixed to base 216 so as to secure unload stack 246 in place on housing 202. Bottom wall 256 is shaped as a truncated disc with two opposed flat edges and two opposed arced edges. Front wall 252 and rear wall 254 extend upwardly from the opposed arced edges of bottom wall 256 and are spaced such that the distance therebetween is slightly greater than the circumference of a digital disc. As such, digital discs 248 may be easily stacked in unload stack 246 with the protective coating facing upward after each disc is reconditioned by apparatus 200. As will be described in greater detail hereinbelow, a gap 258 defined between front wall 252 and rear wall 254 allows an unload arm 270 of a disc transfer mechanism 260 to deposit digital discs 248 into unload stack 246 unimpeded.

Transfer Mechanism Area

Referring still to FIG. 5, transfer mechanism area 208 is located adjacent the front center edge of base 216 of housing 202 between load area 204 and unload area 206. Transfer mechanism area 208 includes a disc transfer mechanism 260 operable to transfer digital discs between load area 204, workstation area 210, and unload area 206. In the illustrated embodiment, disc transfer mechanism 260 comprises a generally cylindrical column 262 having a flattened, open side 264 extending upwardly from base 216 of housing 202. Disc transfer mechanism 260 includes a pick-up mechanism 266 that extends outwardly from open side 264 of column 262. Pick-up mechanism 266 includes a load arm 268 and an unload arm 270 arranged in an "L"-shaped configuration at an approximately right angle to each other. Load arm 268 and unload arm 270 are formed integrally with each other, although these components could alternatively be formed as separate parts that are affixed to each other to form a rigid piece.

A threaded lead screw 278 extends upwardly through the length of column 262 approximately along its center axis. Pick-up mechanism 266 includes a threaded aperture (not shown) configured to mate with the threads of lead screw 278 so that it may be threaded onto lead screw 278 within column 262. With pick-up mechanism 266 threaded onto lead screw 278, lead screw 278 may be turned so as to raise or lower pick-up mechanism 266 on lead screw 278.

A motor 274 is located at the base of column 262 within the interior portion of base 216 and is operable to drive a gear train 276 so as to turn lead screw 268. Motor 274 is preferably a reversible, direct-current motor that may operate in either forward or reverse mode so as to drive lead screw 278 in either direction and, thus, allow pick-up mechanism 266 to be raised or lowered on lead screw 278. In this exemplary embodiment, motor 274 is a Globe Motors model 415A158-3. With motor 274 coupled to lead screw 278 through gear train 276, the controller can raise or lower pick-up mechanism 266 by sending an appropriate electrical signal to motor 274. Preferably, a limit sensor is coupled to lead screw 278 so as to provide a signal to the controller when pick-up mechanism 266 has reached the limits of its operable travel on lead screw 278.

Load arm 268 includes a load hand 280 located at its distal end and, similarly, unload arm 270 includes an unload hand 282 located at its distal end. Load hand 280 and unload hand 282 each include a grasping mechanism for grasping and holding a digital disc. Preferably, proximity sensors are located on the underside of load hand 280 and unload hand 282 so as to provide an electrical signal to the controller when the respective hand is within a predetermined proximity to a digital disc.

In this embodiment, the grasping mechanism of load hand 280 and unload hand 282 includes three fingers that extend downwardly therefrom. Two of the fingers are in a fixed position, and the third finger is movable longitudinally with respect to load hand 280 or unload hand 282. The movable finger may be electrically actuated between a retracted position (in which the spacing between the three fingers is such that the grasping mechanism may be inserted into the center hole of a digital disc) and an extended position (in which the spacing between the three fingers is such that the grasping mechanism frictionally engages the underside of the center hole of the digital disc to thereby grasp and hold the digital disc). Thus, the controller can move the moveable finger between the retracted position and the extended position by sending an appropriate electrical signal to the moveable finger of either load hand 280 or unload hand 282.

Figure 6:
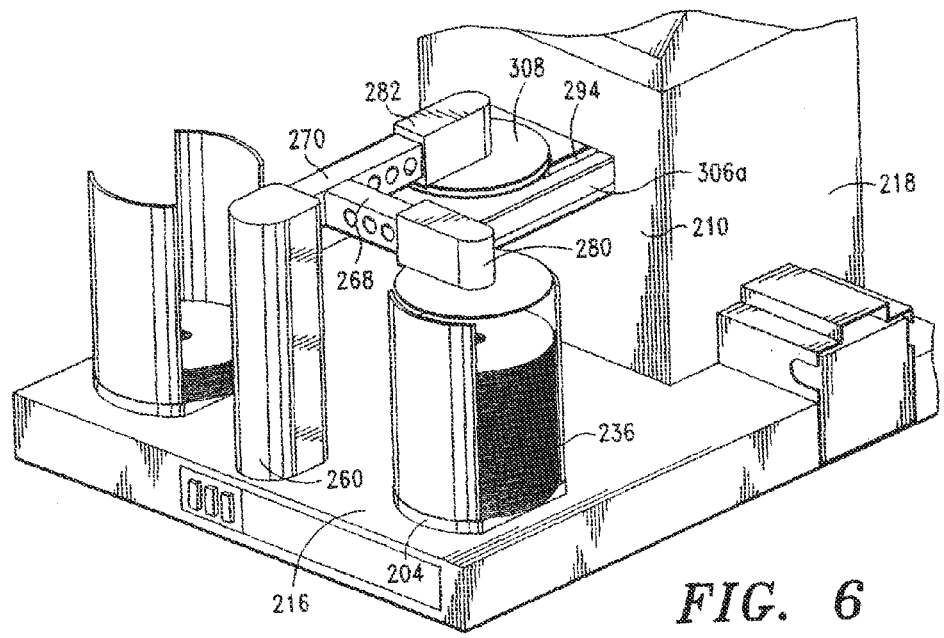
FIG. 6 is a partial perspective view of the reconditioning apparatus of FIG. 5, showing the pick-up mechanism in the load position.
Figure 7:
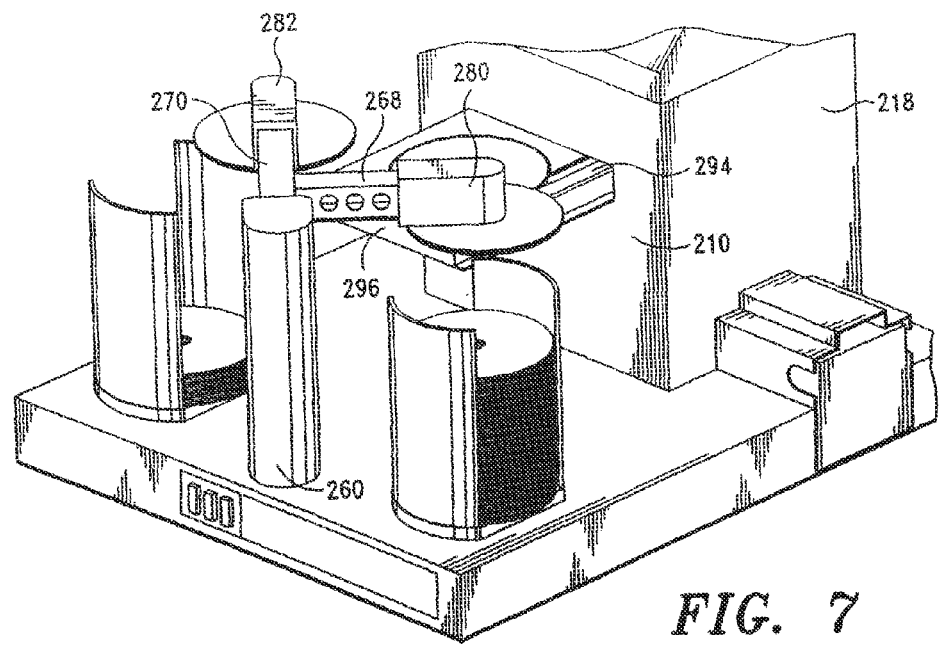
FIG. 7 is a partial perspective view of the reconditioning apparatus of FIG. 5, showing the pick-up mechanism in a transitional position.
Figure 8:
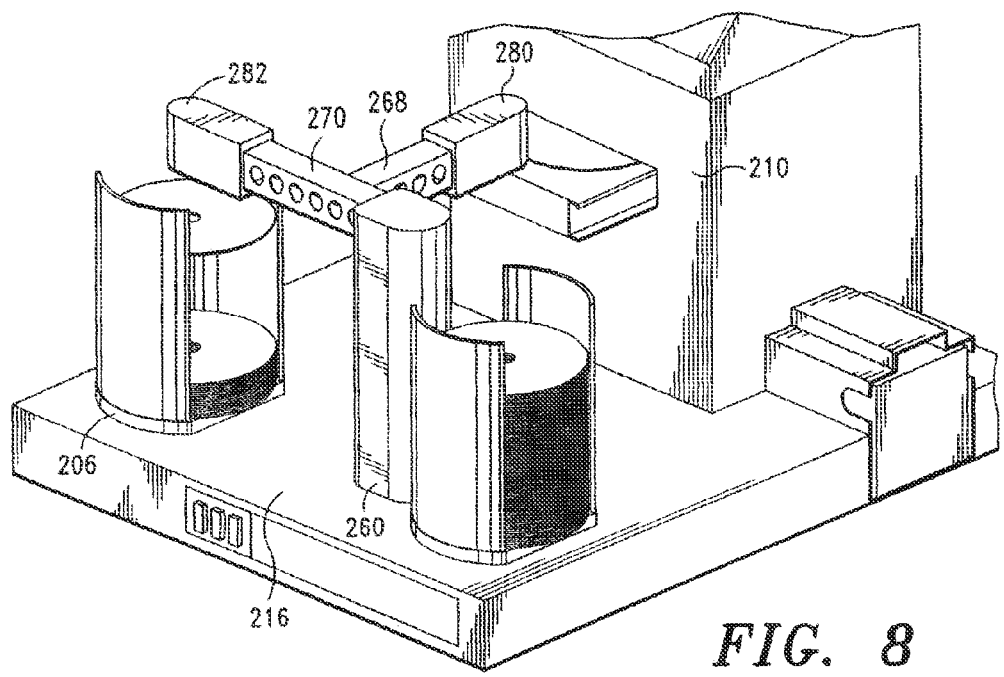
FIG. 8 is a partial perspective view of the reconditioning apparatus of FIG. 5, showing the pick-up mechanism in the unload position.

As shown in FIGS. 6 and 8, disc transfer mechanism 260 is rotatable between a first position (shown in FIG. 6) in which load arm 268 extends outwardly toward load area 204 and unload arm 270 extends outwardly toward workstation area 210, and a second position (shown in FIG. 8) in which load arm 268 extends outwardly toward workstation area 210 and unload arm 270 extends outwardly toward unload area 206. FIG. 7 depicts disc transfer mechanism 260 in its transition from the first position to the second position. A stepper motor (not shown) is located within the interior portion of base 216 and is operable to rotate disc transfer mechanism 260 between the first position and the second position. The controller can thus rotate disc transfer mechanism 260 by sending an appropriate electrical signal to the stepper motor. Suitable load area 204, unload area 206, and disc transfer mechanism 260 (including the load arm, unload arm, stepper motor, and grasping mechanisms) are available commercially as a unit as part number ADL-100, manufactured by Primera Technologies. Of course, other disc loading, unloading, and transferring mechanisms, components, or systems may be used without deviating from the scope of the present invention, and will be apparent to those skilled in the art.

Workstation Area

Referring to FIGS. 5-7, workstation area 210 includes a disc tray 294 for receiving a disc to be reconditioned. Disc tray 294 is movable between a closed position (shown in FIG. 5) and an open position (shown in FIGS. 6 and 7). In the closed position, disc tray 294 is substantially enclosed within workstation area 210 of tower 218 with its front panel 296 flush with the front wall of tower 218. In the open position, disc tray 294 is fully extended outwardly from tower 218. A disc tray actuating mechanism (not shown) located within tower 218 includes an electrically actuated motor that is mechanically coupled to disc tray 294. As such, the controller can move disc tray 294 between the closed position and the open position by sending an appropriate electrical signal to the motor. A suitable disc tray actuating motor in accordance with the present invention is commercially available from Oriental Motors, model AXH5100KC-A. Other motors may of course be used without deviating from the scope of the present invention.

Figure 9:
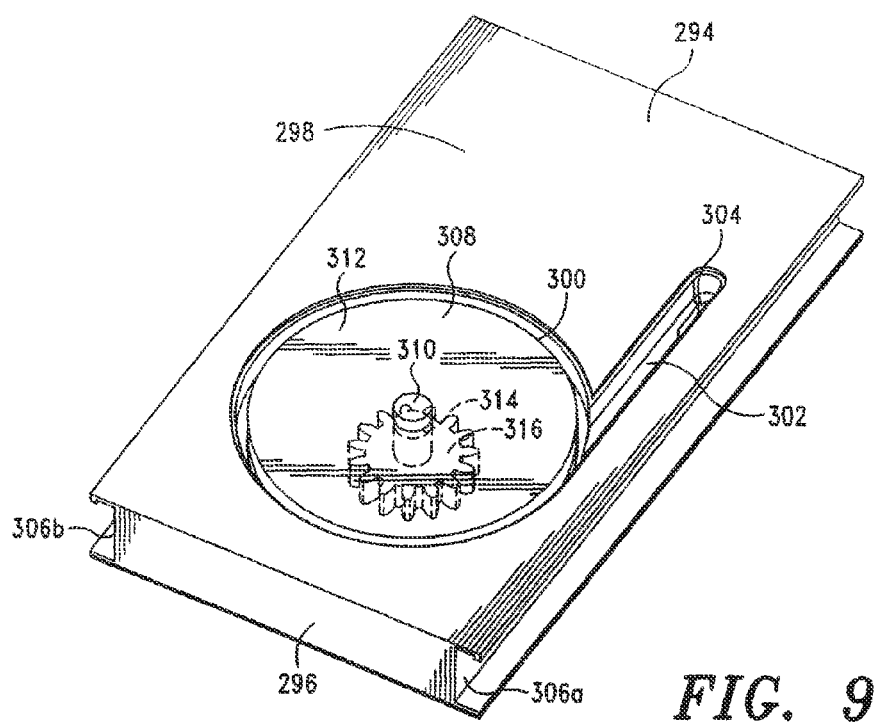
FIG. 9 is a perspective view of the disc tray of the reconditioning apparatus of FIG. 5.

Turning now to FIG. 9, disc tray 294 includes a rectangular body 298 with a circular recess 300 and drain trough 302 formed therein. Recess 300 and drain trough 302 slope slightly towards the rear of disc tray 294, with a drain hole 304 located at the lowest point of drain trough 302. Slots 306a and 306b extend along opposite sides of body 298 and are configured to engage with rails (not shown) mounted within tower 218. As such, disc tray 294 may slide along the rails between the closed position and the open position. A disc-shaped turntable 308 is mounted within recess 300 and is sized to receive and support a digital disc being reconditioned. A centering hole 310 extends through the center of turntable 308 and is positioned to align with the center hole of a digital disc. Preferably, a resilient rubber pad 312 covers the top surface of turntable 308 so as to provide a cushioned support surface for the digital disc and prevent the digital disc from turning or slipping on turntable 308. Thus, a digital disc placed onto turntable 308 is held in position by the frictional engagement of the disc with rubber pad 312 and by the extension of centering nib 310 through the center hole of the disc.

Figure 10:
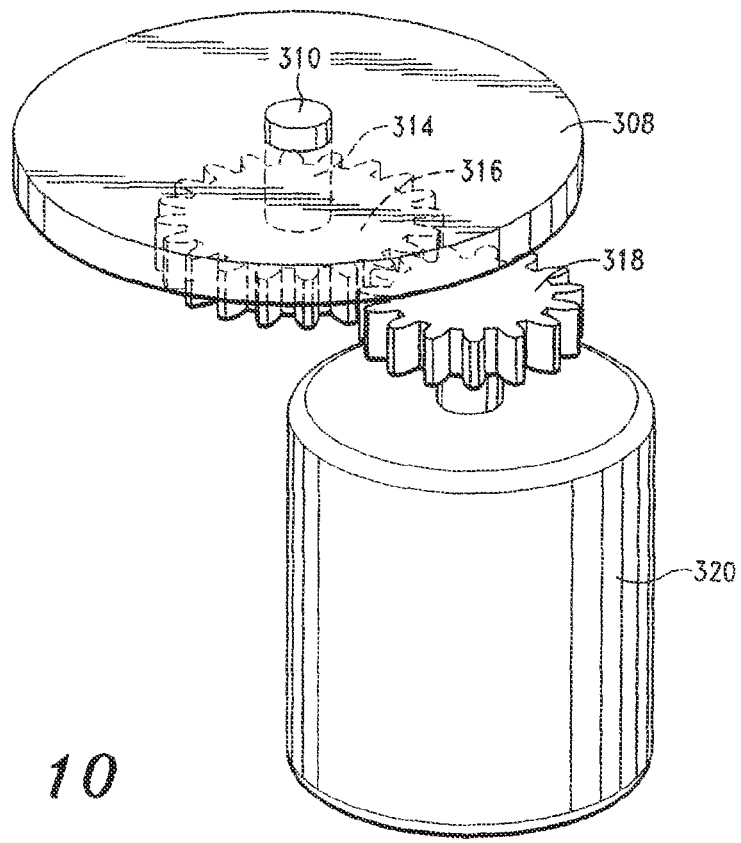
FIG. 10 is a perspective view of the turntable of the disc tray of FIG. 9, and the associated drive motor and planetary gears.

Turning now to FIG. 10, a shaft 314 extends downwardly from the center of turntable 308 and is coupled to a turntable gear 316 located on the underside of disc tray 294. Turntable gear 316 is operable to rotate shaft 314, which in turn rotates turntable 308 within recess 300. With disc tray 294 in its closed position within tower 218, turntable gear 316 engages with a drive gear 318 attached to a drive motor 320 mounted within tower 218. When actuated, drive motor 320 rotates drive gear 318 and turntable gear 316 to thereby rotate shaft 314 and turntable 308. As such, the controller can rotate turntable 308 by sending an appropriate electrical signal to drive motor 320. A suitable drive motor 320 in accordance with the present invention is a variable speed, DC motor having a voltage-to-speed input to allow the controller to command the motor to rotate at predetermined speeds. For example, a command signal level of 0.1 volts direct current (VDC) from the controller may command the drive motor 320 to a rotational speed of 100 rpm, while a command signal level of 2.5 VDC from the controller may command the drive motor to a rotational speed of 1500 rpm.

Figure 11:
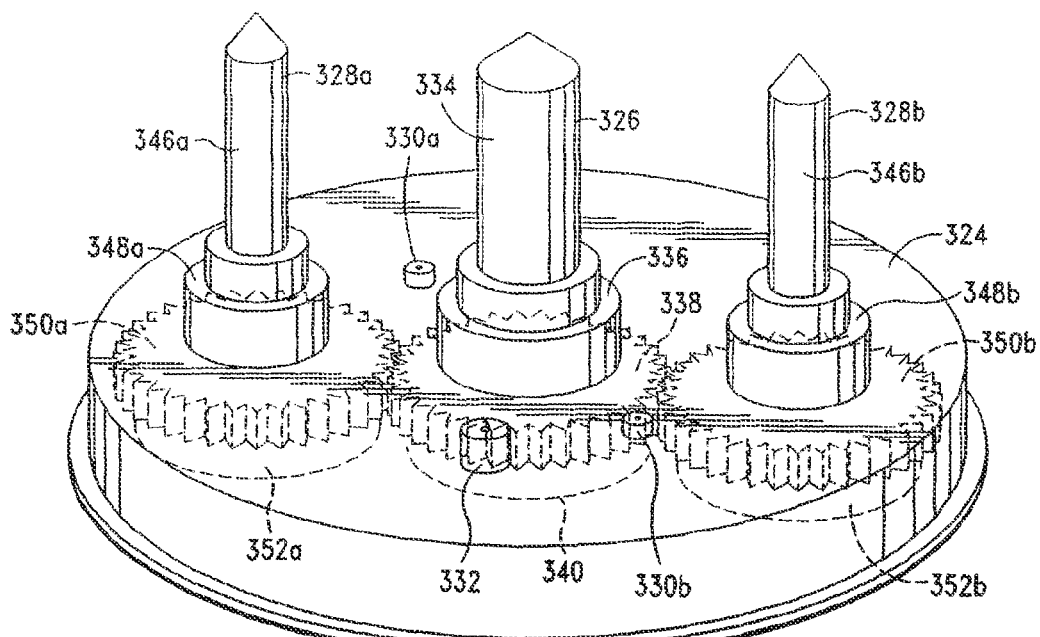
FIG. 11 is a perspective view of the worktool housing and worktools of the reconditioning apparatus of FIG. 5.
Figure 12:
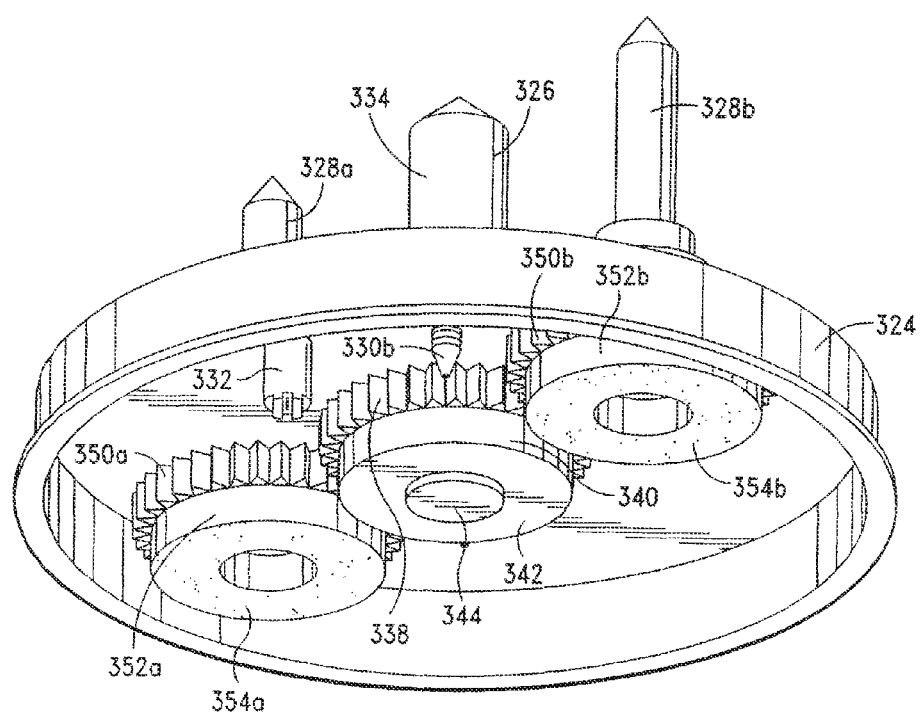
FIG. 12 is an upwardly-looking perspective view of the worktool housing and worktools of FIG. 1, showing the associated abrasive pads and planetary gears.
Figure 13:
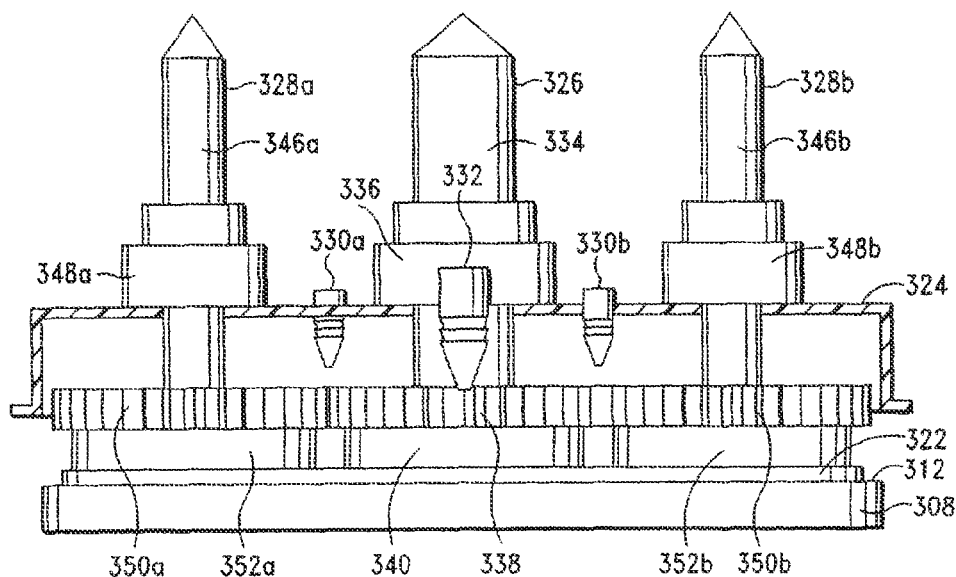
FIG. 13 is an elevational view of the worktool housing and worktools of FIG. 11, showing the worktools in a lowered position so as to contact the digital disc on the turntable.
Figure 14:
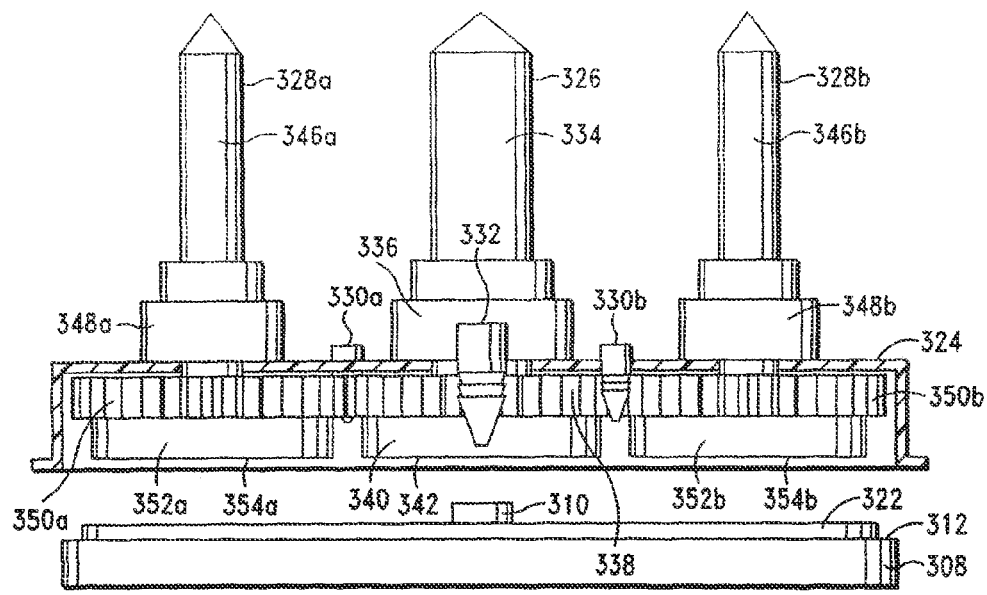
FIG. 14 is an elevational view of the worktool housing and worktools of FIG. 11, showing the worktools in a raised position, not in contact with the digital disc on the turntable.

Looking now to FIGS. 13 and 14, a worktool housing 324 is provided above turntable 308. Worktool housing 324 supports worktools 326, 328a, 328b and nozzles 330a, 330b, 332, which are used to recondition a digital disc 322 on turntable 308. As best shown in FIGS. 11 and 12, worktool 326 comprises a centering tool located in the center of worktool housing 324, and worktools 328a, 328b comprise reconditioning tools located on opposite sides of centering tool 326. Also, nozzles 330a, 330b comprise polish nozzles located on opposite sides of centering tool 326, and nozzle 332 comprises a rinse nozzle located forward of centering tool 326.

Looking still to FIGS. 11 and 12, centering tool 326 comprises a plunger shaft 334 that extends through a boss 336 of worktool housing 324. On the underside of worktool housing 324, plunger shaft 334 is coupled to a planetary gear 338 and a centering disc 340. As best shown in FIG. 12, centering disc 340 includes a resilient rubber pad 342 that covers its lower surface so as to frictionally engage digital disc 322. A centering nib or spindle 344 extends downwardly from centering disc 340 and is configured to fit within and engage the center hole of digital disc 322.

Referring to FIGS. 13 and 14, plunger shaft 334 is configured to fit within an electrically actuated solenoid housing (not shown) located above worktool housing 324. The solenoid housing is electrically coupled to the controller so that the controller can actuate the solenoid to either extend or retract plunger shaft 334 through boss 336. Thus, as shown in FIG. 13, plunger shaft 334 may be extended so that centering disc 340 is moved downwardly with respect to worktool housing 324 so that centering spindle 344 fits within the center hole of digital disc 322 and rubber pad 342 frictionally engages the center portion of digital disc 322. Conversely, as shown in FIG. 14, plunger shaft 334 may be retracted so that centering disc 340 is moved upwardly with respect to worktool housing 324 so that centering disc 340 does not contact digital disc 322.

Looking still to FIGS. 13 and 14, it can be seen that reconditioning tools 328a and 328b have a configuration that is similar to that of centering tool 326. Specifically, reconditioning tool 328a comprises a solenoid plunger shaft 346a that extends through a boss 348a of worktool housing 324. On the underside of worktool housing 324, plunger shaft 346a is coupled to a planetary gear 350a and a reconditioning disc 352a. Similarly, reconditioning tool 328b comprises a solenoid plunger shaft 346b that extends through a boss 348b of worktool housing 324. On the underside of worktool housing 324, plunger shaft 346b is coupled to a planetary gear 350b and a reconditioning disc 352b. As best shown in FIG. 12, reconditioning discs 352a, 352b each include an abrasive pad 354a, 354b that covers its lower surface for reconditioning digital disc 322 (preferably by removing a portion of the protective coating of digital disc 322 without removal of the data underlying the protective coating).

Looking again to FIGS. 13 and 14, plunger shafts 346a, 346b are configured to fit within electrically actuated solenoid housings (not shown) located above worktool housing 324. The solenoid housings are electrically coupled to the controller so that the controller can actuate the solenoids to either extend or retract plunger shafts 346a, 346b through bosses 348a and 348b, respectively. Thus, as shown in FIG. 13, plunger shafts 346a, 346b may be extended so that reconditioning discs 352a, 352b are moved downwardly with respect to worktool housing 324 so that abrasive pads 354a, 354b frictionally engage digital disc 322. Conversely, as shown in FIG. 14, plunger shafts 346a, 346b may be retracted so that reconditioning discs 352a, 352b are moved upwardly with respect to worktool housing 324 so that abrasive pads 354a, 354b do not contact digital disc 322.

Various types of electrically actuated solenoid housings and plunger shafts known in the art may be employed to achieve the objects of the present invention. It should be noted that while each of the three worktools is separately operable, it is desirable that the two reconditioning tools be operated in unison such that either both of the plunger shafts are extended with the associated reconditioning worktools contacting digital disc 322 (as shown in FIG. 13) or both of the plunger shafts are retracted with the associated reconditioning worktools being drawn upwardly away from digital disc 322 (as shown in FIG. 14). As will be described in greater detail hereinbelow, the controller is preferably operable to first extend centering tool 326 to contact and secure digital disc 322, then to extend reconditioning worktools 328a, 328b so that the reconditioning pads contact the surface of the digital disc.

During the reconditioning of digital disc 322, with worktool housing 324 in place above digital disc 322, centering tool 326 is lowered to contact the center portion of digital disc 322. Turntable 308 is rotated via drive motor 320 to approximately 1500 revolutions per minute so that digital disc 322 is likewise rotating at the same rate. Reconditioning worktools 328a, 328b are then lowered so as to contact digital disc 322 on turntable 308 (as shown in FIG. 13). With worktools 326, 328a, 328b contacting digital disc 322, centering disc 340 is frictionally engaged against the center portion of digital disc 322 such that centering tool 326, and its associated planetary gear 338, rotate at the same rate as digital disc 322. Planetary gear 338 of centering tool 326 engages with planetary gears 350*a*, 350*b* of reconditioning tools 328*a*, 328*b*. As such, the rotation of planetary gear 338 causes the rotation of planetary gears 350*a*, 350*b*, which in turn causes the rotation of reconditioning discs 352*a*, 352*b* and their associated abrasive pads 354*a*, 354*b*. Thus, with digital disc 322 rotating on turntable 308, abrasive pads 354*a*, 354*b* also rotate so as to recondition the surface of digital disc 322. In the embodiment shown, the planetary gears 350*a*, 350*b* of reconditioning tools 328*a*, 328*b* are the same size as the planetary gear 338 of centering tool 326. Thus, reconditioning tools 328*a*, 328*b* rotate at the same speed as centering tool 326, which, as described above, rotates at the same speed as digital disc 322 rotates. As will be apparent to one skilled in the art, gears having various sizes and tooth arrangements may equally be used to allow the reconditioning tools to rotate at various rates with respect to the rotational speed of centering tool 326, or to allow the reconditioning tools to each rotate at a different rate. Similarly, while the gearing arrangement in the embodiment shown is such that reconditioning tools 328*a* and 328*b* rotate in opposite directions, other gearing arrangements or gear trains may be used to permit the reconditioning tools to rotate in the same direction.

Referring to FIGS. 11-14, worktool housing 324 also supports polish nozzles 330*a*, 330*b* and rinse nozzle 332. The inlets of polish nozzles 330*a*, 330*b* are located on the top side of worktool housing 324 and are connected to tubing routed to a polish pump (not shown) located in tower 218. Similarly, the inlet of rinse nozzle 332 is located on the top side of worktool housing 324 and is connected to tubing routed to a rinse pump (not shown) located in tower 218. The outlets of polish nozzles 330*a*, 330*b* and rinse nozzle 332 are located on the underside of worktool housing 324 so that the polish and rinse solutions applied through the nozzles will be deposited onto digital disc 322. The pumps used to disperse the polish is preferably a peristaltic pump such as a model WP-1000 manufactured by Welco. The rinse pump is preferably a Sullivan model S752. Of course, other types of pumps may be used without varying from the present invention.

Controller Area

Referring again to FIG. 5, controller area 212 includes a control panel 226 that extends along the front wall of lid 220. In the illustrated embodiment, five pushbutton switches 228 are arranged in a horizontal row along the lower edge of control panel 226, and three liquid crystal displays (LCDs) 230 are arranged in a horizontal row along the upper edge of control panel 226. Labels beneath each of pushbutton switches 228 identify the function ("start", "stop", "eject", "cycle select", and "lid release") associated with the particular switch that will be performed by the controller upon detecting that the switch has been pressed. Pushbutton switches 228 are electrically coupled to the controller such that the controller can detect when a particular switch is pressed and perform a particular function in response. For example, if the controller detects the "Start" switch has been depressed, the controller will initiate the selected reconditioning process as described in more detail herein below. Of course, the controller may condition the initiation of the cycle upon other inputs, such as lid 220 being latched closed, before starting the requested cycle.

LCDs 230 are also in electrical communication with the controller to allow alpha, numeric and graphical information to be conveyed to the operator. Information such as operating instructions, feedback, and status information can be sent from the controller to LCDSs 230 for display. For example, if lid 220 is not properly latched in position, the controller displays a "Lid Ajar" message on the LCD display. Similarly, the controller can prompt the user via LCDs 230 to "Press Start" to begin operation of the apparatus, or can display a percentage of cartridge life remaining status (e.g., "74%"). Of course, other types of switches and displays known in the art may be used in accordance with the present invention.

Cartridge Area

Referring to FIG. 5, cartridge area 214 is located generally at the right rear corner of base 216 at the junction with tower 218. Cartridge area 214 includes a top wall 284, a bottom wall 286, and side walls 288*a*, 288*b*, which together define a cartridge bay 290 for receiving and holding a cartridge 292 therein. Cartridge 292 is a generally cube-shaped cartridge that contains a polish solution reservoir for holding polish solution and a rinse solution reservoir for holding rinse solution. While various types of polish and rinse solutions known in the art may be used, the polish solution is preferably an aluminum oxide polish. Most preferably, the polish solution is an aluminum oxide suspension solution, and the rinse solution is deionized water.

Four female receptacle fittings are located on the inner wall of cartridge 292—two of which connect with the polish solution reservoir and two of which connect with the rinse solution reservoir. The two receptacle fittings that connect with the polish solution reservoir include an outlet port through which polish solution is dispersed to workstation area 210 and an inlet port through which used polish and rinse solution is returned to the polish solution reservoir. The two receptacle fittings that connect with the rinse solution reservoir include an outlet port through which rinse solution is dispersed to workstation area 210 and a breather port through which ambient air enters the reservoir to replace the dispersed rinse solution. The four receptacle fittings of cartridge 292 mate with four corresponding male O-ring sealed fittings located on the inner wall of cartridge bay 290 so as to allow fluid and air to pass into and out of cartridge 292 through the receptacle fittings.

Various tubing connects cartridge 292 to the interior of base 216 and tower 218. Specifically, tubing connects the outlet port of the polish solution reservoir to a polish pump (not shown) mounted in tower 218, and tubing connects the outlet port of the rinse solution reservoir to a rinse pump (not shown) mounted in tower 218. In addition, tubing connects the inlet port of the polish solution reservoir to drain hole 304 in disc tray 294 of workstation area 210 so as to collect used polish and rinse solution in the polish solution reservoir. The breather port of the rinse solution reservoir is open to the atmosphere, thus allowing ambient air to enter the rinse solution reservoir so as to replace the dispersed rinse solution.

The polish pump and rinse pump are electrically actuated and, thus, may be independently actuated by the controller. The controller actuates the polish pump so as to move polish solution from the polish solution reservoir through tubing to workstation area 210 (where polish nozzles 330*a*, 330*b* disperse the polish solution over the digital disc being reconditioned). Similarly, the controller actuates the rinse pump so as to move rinse solution from the rinse solution reservoir through tubing to workstation area 210 (where rinse nozzle 332 disperses the rinse solution over the digital disc being reconditioned).

Preferably, cartridge 292 further comprises a smart chip microcontroller operable to monitor and record the number of repair cycles performed by cartridge 292. Electrical contact points on cartridge 292 engage with electrical contact points on the inner wall of cartridge bay 290 so as to allow communication between the smart chip microcontroller and the controller. Based on the usage information received from the smart chip microcontroller, the controller provides a "percent used" or "percent remaining" indicator to the operator through one of LCDs 230 and, if the usage exceeds a predetermined limit, prohibits operation of apparatus 200 with the spent cartridge 292.

In this embodiment, three different types of cartridges may be used with apparatus 200, namely, a repair cartridge, a buffing cartridge or a self-cleaning cartridge. Upon detection of a repair cartridge, the controller will command apparatus 200 to perform either light, medium, or heavy reconditioning based on input from the operator. A light reconditioning cycle is used for discs having a few, or light scratches, a medium reconditioning cycle is used for discs having more than a few, or medium scratches, and a heavy reconditioning cycle is used for discs having several, or heavy scratches. Upon detection of a buffing cartridge, the controller will command apparatus 200 to perform a light buffing operation. Upon detection of a self-cleaning cartridge, the controller will command apparatus 200 to perform a self-cleaning operation. Preferably, each type of cartridge is identified by information programmed into the smart chip microcontroller of the cartridge.

Operation

As will be described in greater detail hereinbelow, the reconditioning apparatus according to this second embodiment of the present invention is operable to: (1) move disc transfer mechanism 260 to the first position (shown in FIG. 6); (2) lower pick-up mechanism 266 until load hand 280 is in proximity to a digital disc 234 on load stack 232; (3) actuate the grasping mechanism of load hand 280 so as to grasp and hold the top digital disc on load stack 232; (4) raise pick-up mechanism 266 (and the grasped digital disc) out of load stack 232; (5) rotate disc transfer mechanism 260 (and the grasped digital disc) to the second position (shown in FIG. 7); and (6) actuate the grasping mechanism of load hand 280 to release the digital disc so as to deposit the digital disc in workstation area 210.

With reference to FIGS. 5-14, the operation of reconditioning apparatus 200 will now be described in greater detail. In basic operation, an operator securely inserts cartridge 292 into cartridge bay 290 so that the four receptacle fittings of cartridge 292 engage with the four O-ring sealed fittings on the inner wall of cartridge bay 290. With cartridge 292 firmly inserted, the electrical contact points on cartridge 292 mate with the electrical contacts on the inner wall of cartridge bay 290, thus allowing communication between the smart chip microcontroller on cartridge 292 and the controller. The operator then powers on the machine using the power switch on the rear of base 216.

Upon power up, the controller communicates with the smart chip microcontroller on cartridge 292 to determine whether the cartridge is a standard repair cartridge, a buffing cartridge, or a self-cleaning cartridge. Depending on the type of cartridge present, the controller may provide appropriate prompts to the operator through LCDs 230 to select (using the "cycle select" pushbutton switch), for example, either light, medium, or heavy reconditioning.

It should be understood that the initialization sequence performed by the controller may vary without deviating from the scope of the present invention. For example, the controller may query the smart chip microcontroller on cartridge 292 prior to commanding movement of disc transfer mechanism 260. Likewise, the controller may prompt the operator via LCDs 230 to confirm that the operating area is clear, and that operator wants to allow movement of disc transfer mechanism 260. Other variations in the initialization sequence will be apparent to those skilled in the art and are within the scope of the present invention.

Where the controller has detected a repair cartridge in cartridge bay 290, the operator loads a stack of digital discs to be reconditioned into load stack 232 with the protective coating facing upward. The controller then prompts the operator via LCDs 230 to select a "light", "medium", or "heavy" reconditioning cycle using the "cycle select" pushbutton switch 228. With the desired cycle selected, the controller prompts the operator via LCDs 230 to press the "start" pushbutton switch 228.

Upon detecting that the "start" pushbutton switch 228 has been pressed, the controller sends a command signal to the stepper motor in base 216 to ensure that disc transfer mechanism 260 is rotated to its first position (as shown in FIG. 6), if it is not already in that position from the power-up cycle. The controller then sends a command signal to motor 274 so as to turn lead screw 278 and thereby lower pick-up mechanism 266 and load hand 280 towards the top digital disc on load stack 232. When the feedback signal from the proximity sensor indicates that load hand 280 is in close proximity to the top digital disc, the controller stops the command signal to motor 274, at which point the fingers of the grasping mechanism on load hand 280 extend through the center hole of the top digital disc. Next, the controller commands the operable finger of the grasping mechanism on load hand 280 to extend so that the grasping mechanism grasps and holds the top digital disc.

With the top digital disc now securely held by the grasping mechanism of load hand 280, the controller sends a command signal to motor 274 so as to rotate lead screw 278 and raise pick-up mechanism 266 to it uppermost raised position. When the signal from limit sensor on lead screw 278 indicates that pick-up mechanism 266 has reached its uppermost raised position, the controller stops the command signal to motor 274 whereby the grasped digital disc is held in position above load stack 232, awaiting its movement into workstation area 210 for reconditioning as described below.

With load hand 280 located above load stack 232 grasping a disc as just described, unload hand 282 is similarly located in workstation area 210, ready to retrieve a reconditioned digital disc from turntable 308 on disc tray 294. With load hand 280 thus positioned, the controller next sends a command signal to the motor of disc tray 294 so as to move disc tray 294 to its open position to allow retrieval of a reconditioned disc from the tray. Of course, as will be apparent, during this first iteration of the reconditioning process there will be no reconditioned disc to retrieve from turntable 308. However, upon subsequent iterations, a reconditioned disc will be present on turntable 308, ready for retrieval. To retrieve the reconditioned disc, the controller sends a command signal to motor 274 so as to turn lead screw 278 and lower pick-up mechanism 266 and unload hand 282 towards turntable 308 of disc tray 294. While pick-up mechanism 266 is lowering, the controller monitors the feedback signal from the proximity sensor located on unload hand 282. As pick-up mechanism 266 lowers, the fingers of the grasping mechanism on unload hand 282 lower into the center hole of the reconditioned digital disc on turntable 308. When the feedback signal from the proximity sensor indicates that unload hand 282 is in close proximity to the reconditioned disc on turntable 308, the controller stops the command signal to motor 274, holding pick-up mechanism 266 in position, with unload hand 282 held in place directly above the reconditioned disc on turntable 308. Next, the controller commands the operable finger of the grasping mechanism in unload hand 282 to extend so that the fingers of the grasping mechanism frictionally engage and hold the edges of the center hole of the reconditioned digital disc.

With the reconditioned disc now securely held by the grasping mechanism of unload hand 282, and the top digital disc from load stack 236 still securely held by the grasping mechanism of load hand 280, the controller commands motor 274 to rotate lead screw 278 to raise pick-up mechanism 266 to it uppermost raised position. When the signal from limit sensor on lead screw 278 indicates that the pick-up mechanism 266 is at its uppermost raised position, the controller stops the command signal to motor 274. The controller then sends a command signal to the stepper motor in base 216 to rotate disc transfer mechanism 260 to the second position as shown in FIG. 8, with the grasped reconditioned disc held above unload stack 246 and the grasped digital disc from load stack 232 held above turntable 308 on extended disc tray 294.

Looking to FIG. 8, with disc transfer mechanism 260 in the second position, the controller commands the operable finger of the grasping mechanism of unload hand 282 to retract, whereby the reconditioned digital disc is released and is deposited into unload stack 246. Likewise, the controller then commands the operable finger of the grasping mechanism of load hand 280 to retract, so that the digital disc taken from the top of load stack 236 is released and is deposited onto turntable 308. The controller next commands the motor of the disc tray actuating mechanism in tower 218 to retract disc tray 294 into workstation area 210, where the disc will be reconditioned as described hereinbelow.

This load/unload sequence of transferring digital discs to be reconditioned from load stack 236 to turntable 308, and transferring reconditioned discs from turntable 308 to unload stack 246 is repeated until there are no more discs remaining to be reconditioned, as indicated by the limit sensor on lead screw 278 signaling the controller that pick-up mechanism 266 has reached its lower limit.

As described hereinabove, after a disc to be reconditioned has been deposited on turntable 308, the controller commands disc tray 294 to retract into workstation area 210. As shown in FIGS. 9-14, once disc tray 294 is retracted into the workstation area, turntable 308 is positioned beneath worktool housing 324, supporting digital disc 322 for reconditioning by the worktools. Also, when disc tray 294 is retracted, as shown in FIG. 10, turntable gear 316 engages with drive gear 318. When disc tray 294 is retracted and digital disc 322 is positioned beneath the worktool housing 324, the controller provides actuation signals to extend the centering tools' plunger shaft 334 such that the centering disc pad frictionally engages the center portion of digital disc 322.

With digital disc 322 thus secured, the controller next commands the polish pump in tower 218 to begin pumping polish solution from cartridge 292, through tubing, to polish nozzles 330 in worktool housing 324. The polish solution is sprayed from polish nozzles 330 onto the protective coating on the surface of digital disc 322.

After a delay of approximately five seconds, the controller commands reconditioning tools 328a, 328b to extend so that the reconditioning tool plunger shafts 346a, 346b are extended such that the abrasive pads 354a, 354b of the reconditioning discs 352a, 352b engage the outer, protective layer portion of digital disc 322.

The controller then commands drive motor 320, preferably via a 2.5 VDC command signal to the motor's voltage-to-speed input as discussed above, to a rotational speed preferably in the range of approximately 1000 to 2500 revolutions per minute (rpm), most preferably approximately 1500 rpm, thus spinning turntable 308, digital disc 322, and frictionally engaged centering disc 340 to that speed. As described previously, with centering disc 340 rotating due to its frictional engagement with digital disc 322, planetary gear 338 also rotates, which in turn rotates planetary gears 350a, 350b on each of reconditioning tool 328a, 328b. The rotating planetary gears 350a, 350b each rotate their respective plunger shafts 346a, 346b, in turn rotating reconditioning discs 352a, 352b and their associated abrasive pads 354a, 354b. Thus, with digital disc 322 rotating on turntable 308 beneath abrasive pads 354a, 354b, as the abrasive pads simultaneously rotate on their plunger shafts, polishing the surface of disc 322, and with polishing solution being sprayed continuously onto the protective surface of digital disc 322 through polish nozzles 330, the protective surface of digital disc 322 is polished and reconditioned so that scratches and abrasions are removed from the protective surface.

As the reconditioning process continues, excess polish solution drips over the outer edge of digital disc 322 into recess 300 on disc tray body 298. In addition, polish solution thrown from the spinning disc is diverted by a shield (not shown) within workstation area 210 back onto disc 322 and into recess 300. Used polish solution drains into drain trough 302 and to drain hole 304, where tubing routes the used polish solution back to the polish reservoir on cartridge 292, where it is remixed with the polish solution and reused.

Depending on the reconditioning cycle chosen by the operator, the reconditioning process continues for a period of approximately two and one-half minutes (light), approximately five minutes (medium), or approximately eight minutes (heavy), respectively. After the appropriate reconditioning time has elapsed, the controller commands the polish pump to stop pumping polish solution to the digital disc, and commands the reconditioning tool plunger shafts 346a, 346b to perform a retract/extend/retract cycle three times in approximately five seconds so that the abrasive pads 354a, 354b of the reconditioning discs 352a, 352b are repeatedly raised from and lowered against the surface of digital disc 322 to shake any remaining polish off of the abrasive pads. The reconditioning tool plunger shafts are then again extended so that the clean abrasive pads contact the surface of digital disc 322.

The controller then commands drive motor 320, preferably via a 0.1 VDC command signal to the motor's voltage-to-speed input as discussed above, to a rotational speed preferably in the range of approximately 10 to 200 revolutions per minute (rpm), most preferably approximately 100 rpm, and commands the rinse pump in tower 218 to begin pumping rinse solution from cartridge 292, through tubing, to rinse nozzle 332 in worktool housing 324. The rinse solution is sprayed from rinse nozzles 332 onto the protective coating on the surface of digital disc 322. Rinse solution is applied for approximately one-half second, after which time the controller commands the rinse pump to stop pumping rinse solution.

The controller continues to rotate turntable 308 at approximately 100 rpm for approximately seven seconds, then commands the reconditioning tool 328a, 328b solenoid housings to retract the reconditioning worktools' plunger shafts 346a, 346b so that the reconditioning worktools are drawn up into worktool housing 324, away from the surface of digital disc 322. The controller continues to command drive motor 320 to rotate turntable 308 at 1500 revolutions per second for a period of time, preferably approximately eight seconds, to spin any remaining polish or rinse solution off of digital disc 322. The controller then commands centering tool 326 solenoid housing to retract the centering tools' solenoid plunger shafts 334 such that the centering tool is drawn up into worktool housing 324, away from the surface of digital disc 322, and commands drive motor 320 to stop. Used rinse solution from the rinse cycle is captured through recess 300 and drain trough 302 and routed back to the polish reservoir where it is mixed with the polish solution. As described hereinabove, the smart chip microcontroller on cartridge 292 maintains a record of use time for the cartridge so that the recycled polish solution never becomes too diluted or too dirty for reuse.

With the reconditioning process complete, the controller commands disc tray 294 to extend from workstation area 210 so that the reconditioned disc may be unloaded as previously described. This load/unload/reconditioning sequence continues until there are no more discs remaining to be reconditioned, as indicated by the limit sensor on lead screw 278 signaling the controller that pick-up mechanism 266 has reached its lower limit.

With all of the discs from load stack 236 reconditioned and deposited into unload stack 250, the operator can remove the reconditioned discs from unload stack 246, and power off the apparatus.

Variations on this automatic reconditioning process are anticipated by the present invention. For example, while the sequence described involves an operator selecting a reconditioning cycle (light, medium, or heavy) for the entire load stack of discs, it is also possible for the operator to arrange the load stack of discs with discs requiring varying degrees of reconditioning, and programming the controller via the push-button switches to perform the required reconditioning cycle on those particular discs. Thus, an operator may arrange a load stack comprising ten discs requiring a light cycle, twenty discs requiring a medium cycle, and eleven discs requiring a heavy cycle. Stacking the discs in the appropriate order and programming the controller to perform the appropriate cycles in that same order allows the reconditioning process to take place unattended once the operator provides the appropriate programming. Other variations on the specific sequence of steps described herein will be apparent to those skilled in the art, and are within the scope of the present invention.

When the controller detects a polish cartridge present in cartridge bay 290, the controller will only perform a light polishing or buff reconditioning cycle of approximately thirty seconds. The operation of the load/unload/reconditioning cycles are the same as described hereinabove in the repair cartridge description, except that the operator will not be prompted for a desired reconditioning level, and the controller will only recondition each disc for thirty seconds.

When the controller detects a self-cleaning cartridge present in cartridge bay 290, the controller will not recondition any discs, but will only perform an apparatus self cleaning. In the self-cleaning cycle, after the operator presses "start", the controller commands the polish pump in tower 218 to begin pumping cleaning solution from cartridge 292, through tubing, to polish nozzles 330 in work housing 324. The cleaning solution is sprayed from polish nozzles 330 into workstation area 210. The used cleaning solution is collected in recess 300 on disc tray body 298. Used cleaning solution drains into drain trough 302 and to drain hole 304, where tubing routes the used solution back to the cleaning solution reservoir on cartridge 292. After a predetermined amount of time, the controller stops polish pump, and the operator is prompted to remove the self-cleaning cartridge.

While the present invention has been described and illustrated hereinabove with reference to several exemplary embodiments, it should be understood that various modifications could be made to these embodiments without departing from the scope of the invention. Therefore, the invention is not to be limited to the specific embodiments described and illustrated hereinabove, except insofar as such limitations are included in the following claims.

What is claimed and desired to be secured by Letters Patent is as follows:

1. An apparatus for automatically reconditioning a plurality of digital discs, each of said digital discs comprising a first side with data underlying a protective coating and an opposing second side, said apparatus comprising:
   a. a load area configured to hold a plurality of said digital discs arranged in a stack such that the first side of at least one digital disc contacts the second side of an adjacent digital disc;
   b. at least one workstation for reconditioning each of said digital discs, said workstation comprising at least one reconditioning worktool with a head that frictionally engages said first side of each of said digital discs so as to remove a portion of said protective coating of each of said digital discs without removal of said data underlying said protective coating;
   c. an unload area configured to hold a plurality of said reconditioned digital discs arranged in a stack such that the first side of at least one reconditioned digital disc contacts the second side of an adjacent reconditioned digital disc; and
   d. a disc transfer mechanism configured to transfer each of said digital discs from said load area to said workstation, said disc transfer mechanism also configured to transfer each of said digital discs from said workstation to said unload area.

2. The apparatus of claim 1, wherein said plurality of digital discs are reconditioned without manual manipulation of said digital discs to thereby provide automated reconditioning of said digital discs within said apparatus.

3. The apparatus of claim 1, further comprising a controller operable to control said workstation and said disc transfer mechanism.

4. The apparatus of claim 1, wherein said load area comprises a load cartridge.

5. The apparatus of claim 1, wherein said load area comprises a load stack.

6. The apparatus of claim 1, wherein said disc transfer mechanism comprises at least one suction tool operable to grasp each of said digital discs from said load area and deposit each of said digital discs at said workstation.

7. The apparatus of claim 6, wherein said disc transfer mechanism further comprises a second suction tool operable to grasp each of said digital discs from said workstation and deposit each of said digital discs at said unload area.

8. The apparatus of claim 1, wherein said disc transfer mechanism comprises a rotatable pick-up mechanism with at least one arm operable to grasp each of said digital discs from said load area and deposit each of said digital discs at said workstation.

9. The apparatus of claim 8, wherein said rotatable pick-up mechanism further comprises a second arm operable to grasp each of said digital discs from said workstation and deposit each of said digital discs at said unload area.

10. The apparatus of claim 1, wherein said workstation further comprises a rotatable turntable configured to support each of said digital discs.

11. The apparatus of claim 1, wherein said unload area comprises an unload cartridge.

12. The apparatus of claim 1, wherein said unload area comprises an unload stack.

13. An apparatus for automatically reconditioning a plurality of digital discs, each of said digital discs comprising a first side with data underlying a protective coating and an opposing second side, said apparatus comprising:
- a. a load area configured to hold a plurality of said digital discs arranged in a stack such that the first side of at least one digital disc contacts the second side of an adjacent digital disc;
- b. at least one workstation for reconditioning each of said digital discs, said workstation comprising at least one reconditioning worktool with a head that frictionally engages said first side of each of said digital discs so as to remove a portion of said protective coating of each of said digital discs without removal of said data underlying said protective coating, wherein said reconditioning worktool is configured to successively recondition each of said digital discs without adjustment of said reconditioning worktool therebetween;
- c. an unload area configured to hold a plurality of said reconditioned digital discs arranged in a stack such that the first side of at least one reconditioned digital disc contacts the second side of an adjacent reconditioned digital disc; and
- d. a disc transfer mechanism configured to transfer each of said digital discs from said load area to said workstation, said disc transfer mechanism also configured to transfer each of said digital discs from said workstation to said unload area.

14. The apparatus of claim 13, wherein said plurality of digital discs are reconditioned without manual manipulation of said digital discs to thereby provide automated reconditioning of said digital discs within said apparatus.

15. The apparatus of claim 13, further comprising a controller operable to control said workstation and said disc transfer mechanism.

16. The apparatus of claim 13, wherein said load area comprises a load cartridge.

17. The apparatus of claim 13, wherein said load area comprises a load stack.

18. The apparatus of claim 13, wherein said disc transfer mechanism comprises at least one suction tool operable to grasp each of said digital discs from said load area and deposit each of said digital discs at said workstation.

19. The apparatus of claim 18, wherein said disc transfer mechanism further comprises a second suction tool operable to grasp each of said digital discs from said workstation and deposit each of said digital discs at said unload area.

20. The apparatus of claim 13 wherein said disc transfer mechanism comprises a rotatable pick-up mechanism with at least one arm operable to grasp each of said digital discs from said load area and deposit each of said digital discs at said workstation.

21. The apparatus of claim 20, wherein said rotatable pick-up mechanism further comprises a second arm operable to grasp each of said digital discs from said workstation and deposit each of said digital discs at said unload area.

22. The apparatus of claim 13 wherein said workstation further comprises a rotatable turntable configured to support each of said digital discs.

23. The apparatus of claim 13 wherein said unload area comprises an unload cartridge.

24. The apparatus of claim 13, wherein said unload area comprises an unload stack.

25. An apparatus for automatically reconditioning a plurality of digital discs, each of said digital discs comprising a first side with data underlying a protective coating and an opposing second side, said apparatus comprising:
- a. a load area configured to hold a plurality of said digital discs arranged in a stack such that the first side of at least one digital disc contacts the second side of an adjacent digital disc;
- b. at least one workstation for reconditioning each of said digital discs, said workstation comprising at least one reconditioning worktool with a head that frictionally engages said first side of each of said digital discs so as to remove a portion of said protective coating of each of said digital discs without removal of said data underlying said protective coating;
- c. an unload area configured to hold a plurality of said reconditioned digital discs arranged in a stack such that the first side of at least one reconditioned digital disc contacts the second side of an adjacent reconditioned digital disc; and
- d. a disc transfer mechanism configured to transfer each of said plurality of digital discs to said workstation without manual manipulation of said digital discs to thereby provide automated reconditioning of said digital discs within said apparatus.

26. The apparatus of claim 25, wherein said disc transfer mechanism is configured to transfer each of said digital discs from said load area to said workstation, said disc transfer mechanism also configured to transfer each of said digital discs from said workstation to said unload area.

27. The apparatus of claim 26, wherein said disc transfer mechanism comprises at least one suction tool operable to grasp each of said digital discs from said load area and deposit each of said digital discs at said workstation.

28. The apparatus of claim 27, wherein said disc transfer mechanism further comprises a second suction tool operable to grasp each of said digital discs from said workstation and deposit each of said digital discs at said unload area.

29. The apparatus of claim 26, wherein said disc transfer mechanism comprises a rotatable pick-up mechanism with at least one arm operable to grasp each of said digital discs from said load area and deposit each of said digital discs at said workstation.

30. The apparatus of claim 29, wherein said rotatable pick-up mechanism further comprises a second arm operable to grasp each of said digital discs from said workstation and deposit each of said digital discs at said unload area.

\* \* \* \* \*